United States Patent [19]

Ema

[11] Patent Number: 4,916,722
[45] Date of Patent: Apr. 10, 1990

[54] X-RAY IMAGE PROCESSING APPARATUS

[75] Inventor: Takehiro Ema, Ootawara, Japan

[73] Assignee: Kabushiki Kaisha Toshiba, Kawasaki, Japan

[21] Appl. No.: 66,093

[22] Filed: Jun. 24, 1987

[30] Foreign Application Priority Data

Jun. 26, 1986 [JP] Japan .................................. 61-148233
Jun. 26, 1986 [JP] Japan .................................. 61-148234
Jun. 26, 1986 [JP] Japan .................................. 61-148235

[51] Int. Cl.⁴ ............................................. H05G 1/64
[52] U.S. Cl. ...................................... 378/99; 358/111
[58] Field of Search ..................... 378/7, 99; 358/111

[56] References Cited

U.S. PATENT DOCUMENTS

| | | | |
|---|---|---|---|
| 4,229,764 | 10/1980 | Danos ..................................... | 378/99 |
| 4,376,288 | 3/1983 | Shanley, II et al. ................... | 358/34 |
| 4,544,948 | 10/1985 | Okazaki ................................ | 378/99 |
| 4,549,307 | 10/1985 | Macovski .............................. | 378/7 |
| 4,554,587 | 11/1985 | Ooi et al. ............................... | 358/161 |
| 4,559,557 | 12/1985 | Keyes et al. ........................... | 378/99 |
| 4,573,183 | 2/1986 | Relihan ................................. | 378/99 |
| 4,581,635 | 4/1986 | Franke .................................. | 378/99 |
| 4,618,928 | 10/1986 | Honda et al. .......................... | 378/99 |
| 4,656,650 | 4/1987 | Kikuchi et al. ....................... | 378/99 |
| 4,688,242 | 8/1987 | Ema ...................................... | 378/7 |
| 4,761,819 | 8/1988 | Denison et al. ...................... | 358/111 |

Primary Examiner—Janice A. Howell
Assistant Examiner—John C. Freeman
Attorney, Agent, or Firm—Finnegan, Henderson, Farabow, Garrett and Dunner

[57] ABSTRACT

An X-ray image processing apparatus includes an arithmetic operation section for processing the X-ray image data, to eliminate X-ray scattered components (first blurring factor) and a veiling glare (second blurring factor) which occurs when an image intensifier converts X-ray image to a photo-image, and a TV camera converts the photo-image to an image signal. The X-ray image data obtained by eliminating the scattered components and the blurring components derived from the veiling glare includes only blurring components (third blurring factor) derived from the characteristics of an X-ray tube, an image intensifier, and TV camera. A blurring restoration filter circuit is provided, for forming a filter for restoring the blurring from the third factor.

14 Claims, 5 Drawing Sheets

X-RAY IMAGE PROCESSING APPARATUS

BACKGROUND OF THE INVENTION

The present invention relates to an X-ray image processing apparatus for processing X-ray image data obtained by radiating X-rays onto a subject.

In an X-ray image processing apparatus, X-rays radiated onto a subject are detected by an X-ray detector, and an image data is formed based on X-ray data output from the X-ray detector. More specifically, in this X-ray image processing apparatus, an X-ray image signal detected by the X-ray detector is sampled and quantized, and is further subjected to processing, in order to produce a clear image from a blurred image. Image-improving processing is performed for the purpose of removing a noise component to render an image more discernable. Signal processing, for emphasizing a specific component in an image, and processing for gradation conversion are also performed.

The following three factors are considered as being responsible for the blurring of an X-ray image:

1. scattered X-rays;
2. veiling glare which occurs when an image intensifier converts an X-ray image to a photo-image, and a TV camera converts the photo-image to an image signal; and
3. inherent characteristics of an X-ray tube, the image intensifier, and TV camera.

Extensive studies have been carried out, with the aim of eliminating these causes of blurring, and while various countermeasures have been proposed, a completely satisfactory countermeasure has not yet been realized.

SUMMARY OF THE INVENTION

It is an object of the present invention to provide an X-ray image processing apparatus which includes an effective means for eliminating the blurring of an X-ray image.

The X-ray image processing apparatus according to the present invention comprises a scattered X-ray component correction section, for correcting a scattered X-ray component included in image data obtained from an object providing an edge response, and outputting the result as correction data, and a subtraction processor, for fetching the image data and correction data, executing subtraction between these data, and outputting the result as corrected image data, which is then used for forming a spatial digital filter.

DETAILED EXPLANATION OF THE PREFERRED EMBODIMENTS

Figure 1:
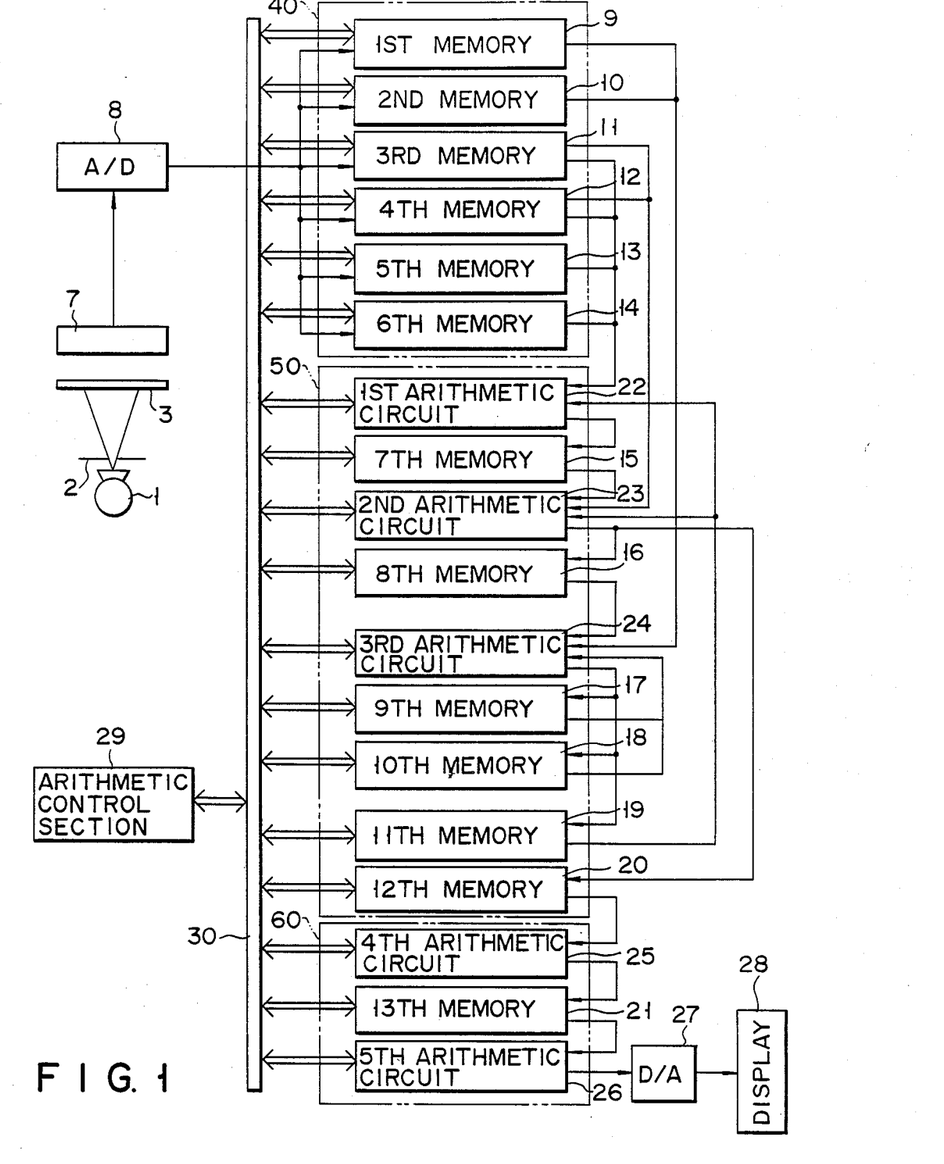
FIG. 1 is a block diagram of an image processing apparatus according to an embodiment of the present invention.

Referring to FIG. 1, X-ray tube 1 is arranged to face X-ray detector 7 sequentially through X-ray aperture 2 and X-ray transmission member 3. X-ray aperture 2 is adopted to determine a radiation field of X-rays.

X-ray detector 7 converts an X-ray image corresponding to an object into an electrical signal. The output terminal of detector 7 is connected to A/D converter 8. The output terminal of converter 8 is connected to data storage section 40 including first to sixth memories 9 to 14. Memories 9 to 14 of data storage section 40 are connected to first to third arithmetic operation circuits 22 to 24 and seventh to 12th memories 15 to 20 of arithmetic operation processing section 50 through bus 30.

Arithmetic operation processing 50 fetches image data from data storage section 40, and executes various arithmetic operations such as calculation of an average of image densities, correction of scattered X-ray components, a predetermined linear arithmetic operation, subtraction among a plurality of image data, and the like.

More specifically, first arithmetic operation circuit 22 fetches image data from third to sixth memories 11 to 14, calculates an average of predetermined density regions of these image data, and outputs the calculation result to seventh memory 15. Note that seventh memory 15 stores predetermined parameters necessary for arithmetic operations in second arithmetic operation circuit 23, such as coefficients $(\alpha,\beta)$ for one-dimensional scattered X-ray correction, and the like. Second arithmetic operation circuit 23 fetches coefficients $(\alpha,\beta)$ from seventh memory 15, and executes a linear arithmetic operation represented by $\alpha xi + \beta$ with respect to input image data (xi). Then, circuit 23 outputs the result to eighth or twelfth memory 16 or 20. Third arithmetic operation circuit 24 executes subtraction between image data fetched from first or second image memory 9 or 10 and image data which is fetched from eighth memory 16 and is subjected to linear arithmetic operation, and sends out the subtraction result to one of ninth to eleventh memories 17 to 19.

Blurring restoration filter circuit section 60 fetches the processing result from arithmetic operation processing section 50, and performs blurring restoration processing with respect to the processing result data. The output terminal of section 60 is connected to CRT display 28 through D/A converter 27.

In blurring restoration filter circuit section 60, fourth arithmetic operation circuit 25 fetches image data from twelfth memory 20, and executes data processing (to be described later) with respect to the input data, thereby forming a restoration filter. Data associated with the blurring restoration filter is stored in thirteenth memory 21.

For input image data which is fetched in addition to the image data for forming the blurring restoration filter, fifth arithmetic operation circuit 26 performs a filter arithmetic operation using data associated with the blurring restoration filter stored in thirteenth memory 21. The arithmetic operation result is input to D/A converter 27.

D/A converter 27 converts the image data subjected to the filter arithmetic operation into analog data, and outputs the analog data to CRT display 28.

An operation when a object is arranged on X-ray shielding member 3 will now be described.

Figure 2A:
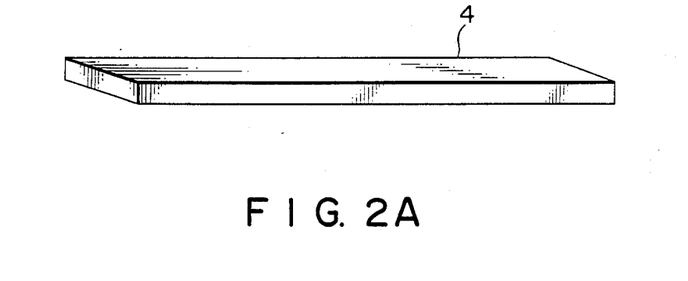
FIGS. 2A through 2C are perspective views of an X-ray absorption member and an X-ray shielding member used as objects in the apparatus shown in FIG. 1.
Figure 2B:
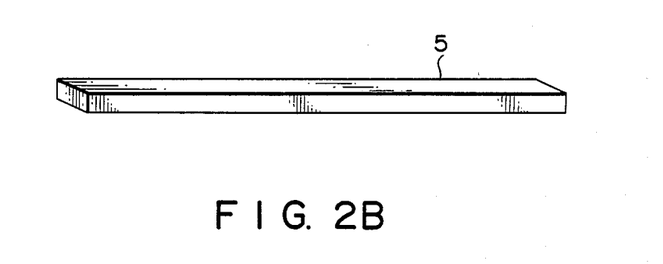
Figure 2C:
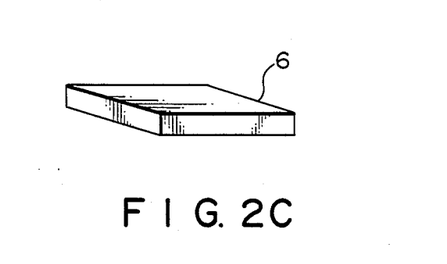

The objects used are elongated thin-plate X-ray absorption member 4 of aluminum, copper, iron, or the like, as shown in FIG. 2A; X-ray shielding member 5 of an elongated lead thin plate or the like, as shown in FIG. 2B, for obtaining one-dimensional scattered X-ray data; and a small chip of X-ray shielding member 6, as shown in FIG. 2C, capable of obtaining scattered X-ray data in a very small area so as to correct the scattered X-ray data.

One or a combination of X-ray absorption member 4 and X-ray shielding members 5 and 6 are arranged on X-ray transmission member 3, as shown in FIGS. 3A to 3C and 3E and 3F, including objects $70a$ to $70c$, $70e$, and $70f$. When only X-ray transmission member 3 is arranged, an object is denoted by $70d$.

X-rays are radiated from X-ray tube 1 onto objects $70a$ to $70f$, and X-ray image data corresponding to these objects are acquired. X-ray image data of objects $70a$ to $70f$ are respectively stored in second memory 10, fourth memory 12, sixth memory 14, first memory 9, third memory 11, and fifth memory 13.

Under the control of arithmetic control section 29, first arithmetic operation circuit 22 fetches X-ray image data of object $70f$ stored in memory 13, calculates image data obtained at addresses corresponding to true images of X-ray shielding members 6, i.e., scattered X-ray component data f, and outputs and stores the calculated image data and its address in seventh memory 15.

Under the control of arithmetic control section 29, circuit 22 similarly fetches X-ray image data of object $70c$ stored in memory 14, calculates image data obtained at addresses corresponding to true images of X-ray shielding members 6, i.e., scattered X-ray component data c, and outputs and stores the calculated image data and its address in seventh memory 15.

Figure 3A:
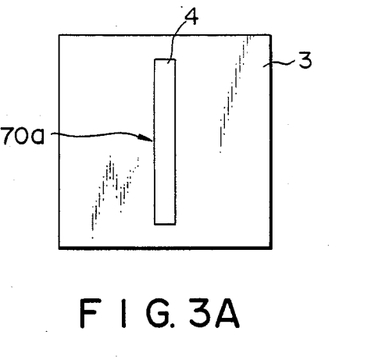
FIGS. 3A through 3F are views showing arrangement patterns of the X-ray absorption and shielding members shown in FIG. 2.
Figure 3B:
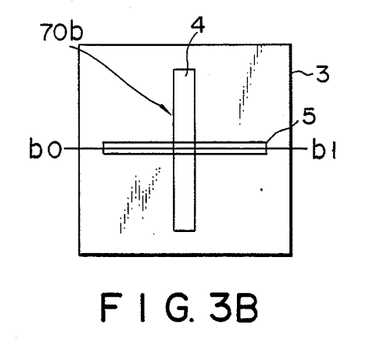
Figure 3C:
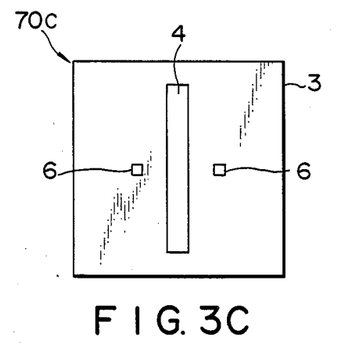
Figure 3D:
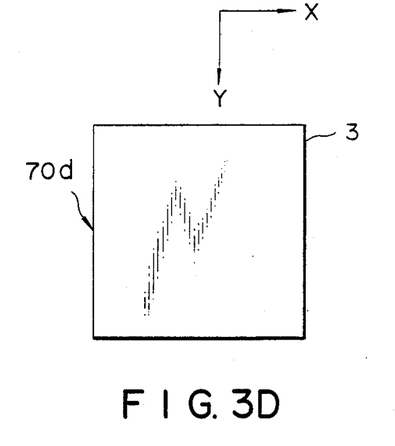
Figure 3E:
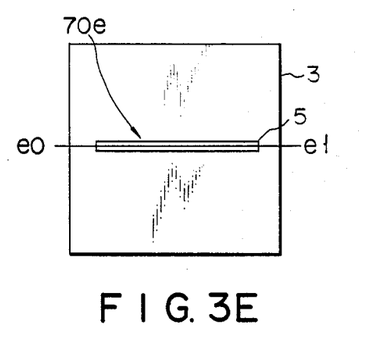
Figure 3F:
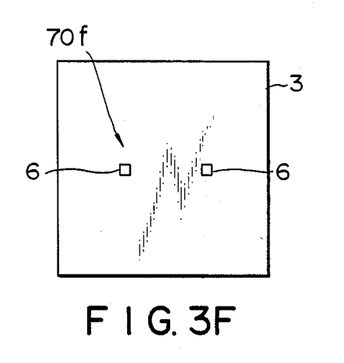

In addition, under the control of arithmetic control section 29, circuit 22 fetches image data of object $70e$ of FIG. 3E stored in third memory 11, selects one line e0-e1 along the X direction from an image region corresponding to a true image of X-ray shielding member 5, calculates image data obtained at addresses closest to those of two X-ray shielding members 6 in scattered X-ray component data f on line e0-e1, i.e., scattered X-ray data e, and stores the results in seventh memory 15.

Finally, under the control of arithmetic control section 29, circuit 22 fetches image data of object $70b$ of FIG. 3B stored in fourth memory 12, selects one line b0-b1 in the X direction from an image region corresponding to a true image of X-ray shielding member 5, calculates image data obtained at addresses on line b0-b1 closest to those of two X-ray shielding members 6 in scattered X-ray component data f on line b0-b1, i.e., scattered X-ray data b, and stores the results in seventh memory 15.

Figure 4A:
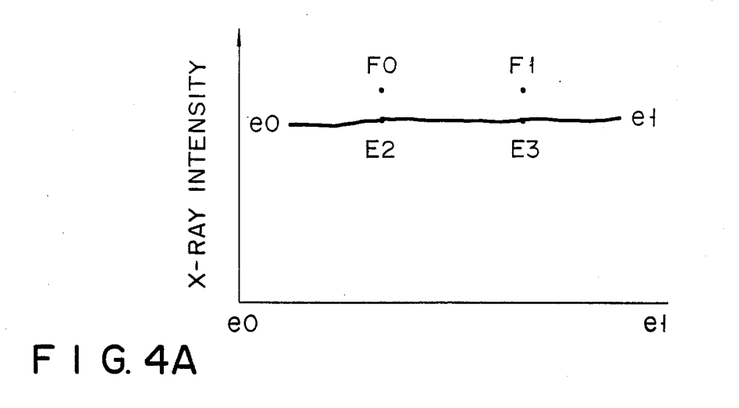
FIGS. 4A and 4B are views showing X-ray intensity profiles corresponding to the arrangement patterns of the X-ray absorption and shielding members shown in FIGS. 3E and 3B.
Figure 4B:
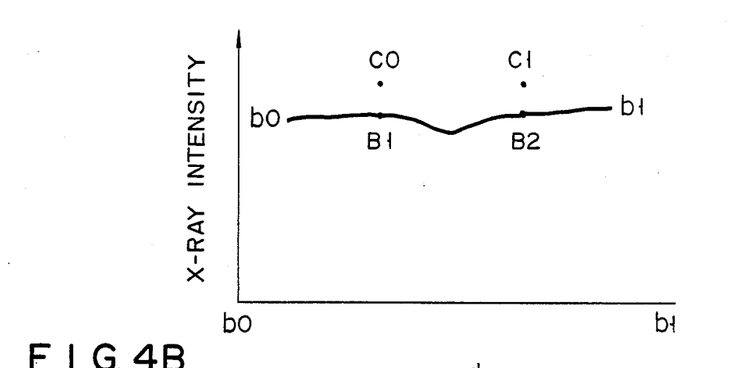

As for image data stored in third and fourth memories 11 and 12, image data of lines e0-e1 and b0-b1 in object patterns shown in FIGS. 3E and 3B, respectively, represent profiles shown in FIGS. 4A and 4B, respectively.

In the profiles shown in FIGS. 4A and 4B, F0 and F1 indicate two image data (X-ray intensities) in scattered X-ray component data f, and B1 and B2 indicate two image data (X-ray intensities) in scattered X-ray component data b.

In the X-ray intensity profile shown in FIG. 4A, X-ray intensities F0 and F1 are larger than E2 and E3. In X-ray intensity profile shown in FIG. 4B, X-ray intensities C0 and C1 are larger than B1 and B2. This is true because X-ray shielding member 5, measured at a point corresponding to X-ray intensity E2 along line e0-e1, occupies a larger area in an X-ray radiation field than that of X-ray shielding member 6, and therefore, scattered X-ray components to be measured are partially cut. Therefore, it is not preferable to use scattered X-ray component data along line e0-e1 without modification. For this reason, correction is necessary.

Correction processing will be described below.

A ratio of scattered X-ray component data f to scattered X-ray component data b, i.e., F0/E2, F1/E3, C0/B1, and C1/B2 in X-ray intensity profiles shown in FIGS. 4A and 4B, are calculated. An average of F0/E2 and F1/E3 (correction coefficient is given as E) and an average of C0/B1 and C1/B2 (correction coefficient is given as B) are respectively calculated, and are stored in seventh memory 15.

Second arithmetic operation circuit 23 fetches the object pattern shown in FIG. 3E, i.e., image data of object $70e$, stored in third memory 11, and executes an arithmetic operation for a linear density conversion while coefficient $\alpha$ is given by correction coefficient E, and coefficient $\beta$ is given by zero. The operation result is stored in eighth memory 16.

Third arithmetic operation circuit 24 fetches the object pattern shown in FIG. 3D, i.e., image data of object $70d$ stored in first memory 9, and corrected scattered X-ray component data for one line stored in eighth memory 16, executes subtraction therebetween, and stores the subtraction result in ninth memory 17.

Second arithmetic operation circuit 23 similarly fetches the object pattern shown in FIG. 3B, i.e., image data of object $70b$, stored in fourth memory 12, and executes an arithmetic operation for a linear density conversion while coefficient $\alpha$ is given by correction coefficient E, and coefficient $\beta$ is given by zero. The operation result is stored in eighth memory 16.

Third arithmetic operation circuit 24 also fetches the object pattern shown in FIG. 3A, i.e., image data of object $70a$ stored in second memory 10, and corrected scattered X-ray component data for one line stored in eighth memory 16, executes subtraction therebetween, and stores the subtraction result in tenth memory 18.

With the above series of data processing, image data corresponding to the object pattern shown in FIG. 3D, i.e., image data of object $70d$ from which scattered X-ray components for one line are removed, and image data corresponding to the object pattern shown in FIG. 3A, i.e., image data of object $70a$ from which scattered X-ray components for one line are removed, are respectively stored in ninth and tenth memories 17 and 18.

Third arithmetic operation circuit 24 fetches image data respectively stored in ninth and tenth memories 17 and 18, and executes subtraction therebetween. Then, third arithmetic operation circuit 24 stores the subtraction result in memory 19. This processing eliminates the influence of the position of the detection surface of X-ray detector 3 on the image data.

Of image data stored in eleventh memory 19, an effective image component corresponds to only one line. The effective one-line image data is represented by the image density profile shown in FIG. 5A.

Figure 5A:
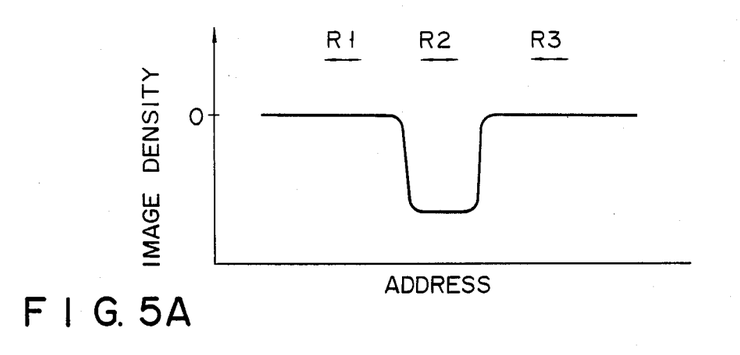
FIGS. 5A through 5C are views showing density profiles of image data sent to an arithmetic operation processor shown in FIG. 1.
Figure 5B:
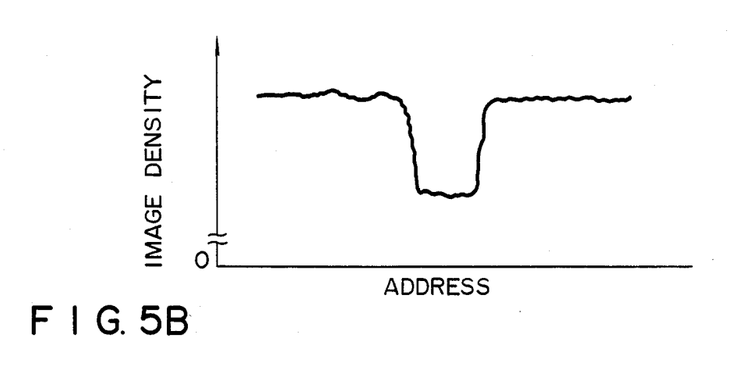

The image density profile shown in FIG. 5B represents effective image data corresponding to one line stored in tenth memory 18.

When image data for a plurality of lines are used in order to obtain a blurring restoration filter, image data is acquired again by a method of, e.g., spatially moving X-ray shielding member 3 while fixing X-ray shielding members 5 and 6 and X-ray absorption member 4 in position. The above-mentioned series of processing is performed with respect to the acquired data, thereby obtaining effective image data for another line. In this manner, the above operation is repeated several times, and effective image data for a plurality of lines can be obtained. At this time, at second image data acquisition and thereafter, image data corresponding to objects 70a and 70b shown in FIGS. 3A and 3B need not be acquired.

Processing for correcting a nonuniform image density caused by fluctuations in voltage applied to the X-ray tube and in current supplied thereto will be described below.

Even if the X-ray tube is set under the constant operating conditions (voltage, current, etc.), a predetermined level of X-rays cannot always be radiated onto an object due to fluctuations in application voltage or current. For this reason, the density level of the overall display image often becomes nonuniform. Immediately after image data is acquired, a specific density region expected to have no density variation is detected using first arithmetic operation circuit 22. Of the first detected image data, a given density obtained from image data of one frame is used as a reference density, and the remaining image data is density-converted by second arithmetic operation circuit 23 based on the reference density, thereby performing correction.

When image data having at least one effective line is stored in eleventh memory 19, the following step is executed.

More specifically, first arithmetic operation circuit 22 fetches image data stored in eleventh memory 19, and calculates image densities of regions at the two sides of edges of an object where almost no change in density appears, i.e., regions R1, R2, and R3 in the image density profile shown in FIG. 5A. In other words, if densities in regions R1, R2, and R3 are, respectively, given as D1, D2, and D3, average L of density D2 and an average of densities D1 and D3 is calculated. Since density D1 is substantially equal to density D2, an average of densities D1 and D2 can be regarded as L. All the regions of an object including edges are assumed, and an average of DC components in these regions can be regarded as L.

Figure 5C:
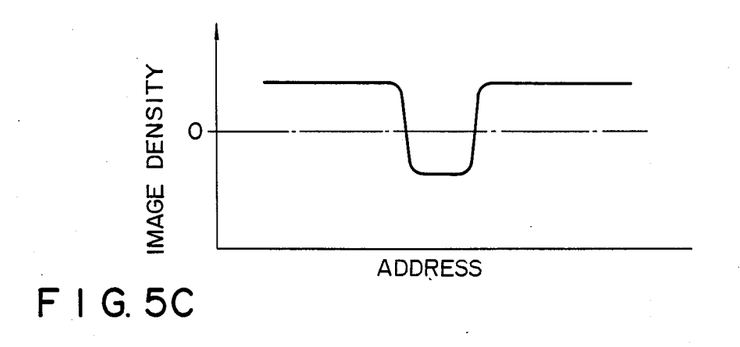

Second arithmetic operation circuit 23 fetches image data stored in eleventh memory 19, and subtracts average L from each image data using correction coefficients $\alpha=1$ and $\beta=-L$. Second arithmetic operation circuit 23 stores the subtraction result in twelfth memory 20 as correction image data. The image density profile shown in FIG. 5C shows effective one-line data of image data stored in twelfth memory 20. As shown in FIG. 5C, upper and lower portions of an edge, respectively, indicate positive and negative values around level "0". This means that density converted data from which DC components are removed is obtained. The density converted data is subjected to data processing for obtaining spatial digital filter data for restoring a blurred image.

When the above data processing is executed, density D2 and a group of densities D1 and D3 can respectively be negative and positive values, and the density is not strictly limited to average L.

With the above signal processing, correction image data necessary for obtaining a blurring restoration filer is stored in twelfth memory 20.

Data processing for obtaining blurring restoration filter data for restoring the blurring components caused by the veiling glare will now be described.

A density of blurred image data is given as Bi,j, ideal image data created by a proper method is given by Ii,j, the number of times of calculation is T, and an estimated restoration filter to be obtained after T calculations is given as fk(T).

Note that i and j indicate addresses of image data, and k indicates a position of each filter coefficient relative to a central filter coefficient in an estimated restoration filter. Therefore, if a filter size is given as 2K+1, $-K \leq k \leq K$.

Density Fi,j of image data obtained by processing blurred components by estimated restoration filter fk(T) can be obtained by the following equation:

$$Fi,j(T) = \sum_{k=-k}^{k} fk(T) \cdot Bi - K \qquad (1)$$

If a difference (difference image data) between ideal image data Ii,j and processed image data Fi,j(T) for each image data is given as Ei,j(T), difference image data Ei,j(T) can be obtained by the following equation:

$$Ei,j(T) = Fi,j(T) - Ii,j \qquad (2)$$

When a square sum of difference image data in given region R, including edges of an object, is used while an index indicating a degree of coincidence between ideal image data Ii,j and processed image data Fi,j(T) is given as T, index V can be obtained by the following equation:

$$V = \sum_{i,j}^{R} (Ei,j(T)/Ii,j)^2 \qquad (3)$$

Note that Ei,j(T) is divided by Ii,j for normalization.

When a gradient method is adopted as a method for estimating a restoration filter, the next stage estimated restoration filter fk(T+1) can be calculated by the following equation:

$$fk(T+1) = fk(T) - a \cdot \delta V / \delta fk(T) \qquad (4)$$

Equations (1), (2), and (3) are substituted in equation (4) to obtain the following equation:

$$fk(T+1) = fk(T) - 2a \cdot \sum_{i,j}^{R} \cdot (Bi - k,j \cdot Ej,j(T)/I,j^2) \qquad (5)$$

where a is an acceleration constant.

From equation (5), the blurring restoration filter relative to a direction denoted by the item i can be obtained. Similarly, the equation for forming the blurring restoration filter relative to a direction denoted by item j is obtained. Also, an equation taking both of items i and j into consideration may be obtained. Based on equation (5), the blurring restoration filter can be obtained by the following processing.

More specifically, fourth arithmetic operation circuit 25 fetches corrected image data stored in twelfth memory 20, and executes arithmetic operation processing of this corrected image data to obtain restoration filter data. The calculation result is stored in thirteenth memory 21. Blurring restoration filter data is stored in thirteenth memory 21 under the control of arithmetic control section 29.

The resultant blurring restoration filter data is used for correcting all the acquired image data. More specifically, image data to be corrected and blurring restoration filter data are fetched by fifth arithmetic operation circuit 26. The image data is subjected to filter processing by fifth arithmetic operation circuit 26, and the processing result is converted to an analog signal by D/A converter 27. The analog image signal is input to CRT display 28, and is displayed thereon as a good X-ray image free from blurring.

In the above embodiment, X-ray absorption member 4 has been described as a member for providing two edge responses. A plurality of X-ray absorption members can be used to obtain a large number of edge responses. Alternatively, an X-ray absorption member can be arranged to obtain a single edge response. In this case, X-ray absorption member 4 has a large width, and is arranged so that an image of an object upon X-ray radiation covers one side half of X-ray transmission number 3.

Two X-ray shielding members 6 are used in the above embodiment. A single or three or more X-ray shielding members can be used. If a plurality of members 6 are used, they are arranged at intervals with which interference between adjacent X-ray shielding members does not occur.

When image data for a plurality of lines are necessary, image data acquisition and processing are repeated in the above embodiment. However, when a capacity of a memory for storing image data is increased, all the necessary image data can be acquired at once, and thereafter data processing can be performed.

In image data processing, a memory (eighth memory 16) for storing image data including density-corrected scattered X-ray component data for one line and memories (ninth and tenth memories 17 and 18) for storing image data including an effective line from which scattered X-ray components are removed, and the like are used. In each step, all the image data to be processed are processed, and thereafter, processing advances to the next step.

Eighth to tenth memories 16 to 18 can be replaced with memories having a storage capacity corresponding to one line since effective image data in the entire image data corresponds to one line. If image data for a plurality of lines are not necessary, eleventh and twelfth memories 19 and 20 can be replaced with memories having a storage capacity of one line.

Figure 6:
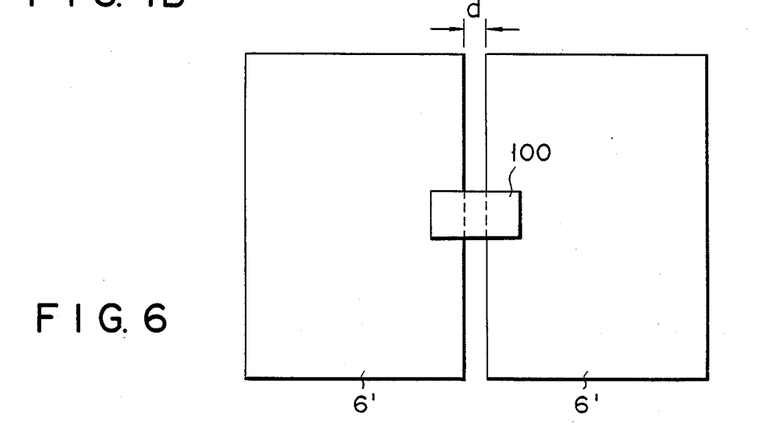
FIG. 6 is a view showing arrangements of an X-ray shielding member used in another embodiment.

In the above embodiment, scattered X-ray components are removed by electrical processing. As shown in FIG. 6, two X-ray shielding members 6' are arranged at distance d through which a very small amount of scattered X-rays is passed, e.g., at a distance of 3 to 4 mm, and object 100 is arranged between members 6'. In this state, X-rays are radiated from members 6' onto object 100. X-ray detector 7 can output an X-ray image signal substantially excluding scattered components.

The output image signal is converted to digital image data by an A/D converter, and the digital data is subjected to data processing by arithmetic operation processing section 50. Since no components based on scattered X-rays are included in input image data, processing for removing the components based on the scattered X-rays can be omitted from processing for removing blurring components from image data. Therefore, processing for removing the remaining factors of the blurring components of the X-ray image data, i.e., factors caused by veiling glare and characteristics of the X-ray tube and the camera need only be performed to obtain an X-ray image free from blurring.

Blurring components caused by the veiling glare can be removed by the following process.

An object having a pin-hole is used as the object 100, and the X-ray image corresponding to the pin-hole object converts into the X-ray image data. This image data is processed to form an ideal X-ray image data. The result obtained by performing subtraction between said ideal image data and the pin-hole image data is processed to obtain a filter for eliminating blurring components based on the second factor, i.e., veiling glare.

Another method for removing the blurring components based on the veiling glare may use an object wider than the waveform of the image signal obtained by the pin-hole object.

When the blurring components based on the veiling glare are removed as described above, the processing for removing blurring components based on the third factor, i.e., the inherent characteristics of an X-ray tube, image intensifier, and TV camera can be performed on the basis of the equation (5).

What is claimed is:

1. An x-ray image processing apparatus comprising:
   X-ray radiating means for radiating at least one of a first, second, third, and fourth object, with X-rays;
   output means for outputting first image data corresponding to the first object including an X-ray shielding member, second image data corresponding to the second object including an X-ray shielding member and an X-ray absorption member, third image data corresponding to the third object which excludes the X-ray absorption member, and fourth image data corresponding to the fourth object including the X-ray absorption member, upon X-ray radiation;
   first arithmetic operation processing means, for subtracting the third X-ray image data from the first X-ray image data, to output first corrected image data from which scattered X-ray components are removed, and for subtracting the fourth X-ray image data from the second X-ray image data, to output second corrected image data from which scattered X-ray components are removed;
   second arithmetic operation processing means, for subtracting the second corrected image data from the first corrected image data, for outputting third corrected image data; and
   filter data output means for arithmetically processing the third corrected image data, in accordance with predetermined equations, to obtain restoration filter information.

2. An apparatus according to claim 1, wherein said output means includes means for outputting first correction data corresponding to image data of a fifth object, which excludes an X-ray absorption member, and outputting second correction data corresponding to image data of a sixth object, which includes the X-ray absorption member, and wherein said first arithmetic operation processing means includes means for arithmetically processing the first and second X-ray image data according to the first and second correction data, to correct the first and second X-ray image data according to the first and second correction data, respectively.

3. An apparatus according to claim 2, wherein the fifth and sixth objects include small chips of X-ray shielding members for obtaining X-rays scattered by a very small object.

4. An apparatus according to claim 1, wherein said second arithmetic operation processing means includes means for executing arithmetic operation processing to remove DC components from the third corrected image data.

5. An apparatus according to claim 1, wherein the first and second objects include an elongated X-ray shielding member for obtaining X-rays scattered in one direction.

6. An apparatus according to claim 1, wherein the second and fourth objects include an X-ray absorption member consisting of at least one element selected from the group consisting of aluminum, copper, and iron.

7. An X-ray image processing apparatus producing an X-ray image of an object, comprising:
   X-ray radiating means for radiating the object with X-rays;
   output means for outputting, upon X-ray radiation, a first and a second type of X-ray image data including the object, and a third and a fourth type X-ray image data excluding the object;
   correcting means for correcting the first and the second type X-ray image data by correction coefficients, to output first and second corrected type X-ray image data respectively;
   first arithmetic operation processing means, for subtracting the third type X-ray image data from the first corrected type X-ray image data, to output first corrected image data from which scattered X-ray components are removed;
   second arithmetic operation processing means, for subtracting fourth type X-ray image data from the second corrected type X-ray image data, to output second corrected image data from which scattered X-ray components are removed;
   means for calculating a difference between the first corrected image data output from said first arithmetic operation processing means and the second corrected image data output from said second arithmetic operation processing means, to output difference data; and
   means for executing correction processing of the first corrected image data output from said first arithmetic operation processing means, according to the difference data, to equalize a density level of the X-ray image.

8. An apparatus according to claim 7, wherein the object includes at least one small chip of an X-ray shielding member for obtaining X-rays scattered by a very small object.

9. An apparatus according to claim 7, wherein said second arithmetic operation processing means includes means for executing arithmetic operation processing to remove DC components from the second corrected image data.

10. An apparatus according to claim 7, wherein said object includes an elongated X-ray shielding member for obtaining X-rays scattered in one direction.

11. An apparatus according to claim 10, wherein said X-ray shielding member consists of lead.

12. An X-ray image processing apparatus comprising:
   X-ray radiation means for radiating x-rays onto a first object including one of a one-dimensional X-ray shielding member, radiating a second object including at least one small chip of X-ray shielding member which is located at a position where no scattered X-ray component passes, and radiating a third object;
   first output means for detecting X-rays transmitted through said second object which includes true scattered X-ray components produced by said X-ray radiation means, for outputting a true scattered X-ray data corresponding to the true scattered X-ray components not shielded by the one-dimensional X-ray shielding member, and for outputting x-ray data of said third object;
   means for calculating correction coefficients from a one-dimensional scattered X-ray data corresponding to an X-ray image of the one-dimensional shielding member and the true scattered X-ray data;
   second output means for outputting X-ray image data corrected by the correction coefficients;
   arithmetic operation processing means for outputting corrected image data by having means to obtain a difference between said x-ray data of said third object and from said X-ray image data obtained from said second output means; and
   means for correcting the image data output from said first output means according to the corrected image data.

13. An apparatus according to claim 12, wherein said output means includes means for converting an X-ray image, corresponding to the object, into the X-ray image data, and means for eliminating blurring components responsive to said converting means.

14. An apparatus according to claim 13, wherein said converting means of said output means includes an image intensifier for converting the X-rays emitted from said X-ray radtiation means and passed through said object, to a photo-image, and photographing means for converting the photo-image into the X-ray image data.

* * * * *

UNITED STATES PATENT AND TRADEMARK OFFICE
CERTIFICATE OF CORRECTION

PATENT NO. : 4,916,722
DATED : April 10, 1990
INVENTOR(S) : Takehiro Ema

It is certified that error appears in the above-identified patent and that said Letters Patent is hereby corrected as shown below:

Claim 1, Column 8, Line 33, change "x-ray" to --X-ray--;

Claim 12, Column 10, Line 52, change "radtiation" to --radiation--.

Signed and Sealed this

Fourteenth Day of July, 1992

*Attest:*

DOUGLAS B. COMER

*Attesting Officer*  *Acting Commissioner of Patents and Trademarks*